US012480345B1

(12) United States Patent
Ward et al.

(10) Patent No.: US 12,480,345 B1
(45) Date of Patent: Nov. 25, 2025

(54) INTEGRATED BRACKET ASSEMBLY WITH HEAD STOP FOR OVERHEAD DOORS

(71) Applicant: CLTC LLC, Atlanta, GA (US)

(72) Inventors: Ethan Ward, Carrollton, GA (US); Tony Ward, Carrollton, GA (US)

(73) Assignee: CLTC LLC, Atlanta, GA (US)

( * ) Notice: Subject to any disclaimer, the term of this patent is extended or adjusted under 35 U.S.C. 154(b) by 0 days.

(21) Appl. No.: 19/301,880

(22) Filed: Aug. 15, 2025

(51) Int. Cl.
*E05D 15/22* (2006.01)
*E06B 9/56* (2006.01)

(52) U.S. Cl.
CPC ........ *E05D 15/22* (2013.01); *E05D 2015/225* (2013.01); *E06B 9/56* (2013.01)

(58) Field of Classification Search
CPC ...... E05D 15/22; E05D 2015/225; E06B 9/56
USPC .......................................................... 248/300
See application file for complete search history.

(56) References Cited

U.S. PATENT DOCUMENTS

| | | | | |
|---|---|---|---|---|
| 3,213,924 | A | 10/1965 | Crosswell | |
| 5,172,744 | A * | 12/1992 | Finch | E06B 9/174 160/133 |
| 5,474,117 | A | 12/1995 | Henkenjohann | |
| 5,778,490 | A * | 7/1998 | Curtis | E05D 13/1261 160/191 |
| 6,155,327 | A * | 12/2000 | Wells | E06B 9/60 160/198 |
| 6,527,037 | B2 * | 3/2003 | Daus | E06B 9/60 160/133 |
| 6,955,206 | B2 | 10/2005 | Mullet et al. | |
| 6,959,751 | B2 * | 11/2005 | Savard | E06B 9/68 160/315 |
| 7,017,644 | B1 | 3/2006 | Kraeutler | |
| 7,254,868 | B2 * | 8/2007 | Mullet | E05D 13/003 160/191 |
| 7,284,736 | B2 | 10/2007 | Franssen | |
| 8,662,139 | B2 | 3/2014 | Anthony et al. | |
| 9,206,634 | B1 | 12/2015 | Prieto et al. | |

(Continued)

FOREIGN PATENT DOCUMENTS

WO 2023122318 6/2023

OTHER PUBLICATIONS

Steel Blue; 9530 Series; https://cdn.prod.website-files.com/67056edddac9378636046a68/67056edddac9378636046c22_sb-9530-data%20sheet.pdf; [accessed Sep. 16, 2025].

*Primary Examiner* — Anita M King
(74) *Attorney, Agent, or Firm* — HULSEY P.C.

(57) ABSTRACT

A bracket assembly for overhead roll-up doors includes a bracket body, and a head stop extending from the bracket body. The head stop is configured to limit travel of a roll-up door. The head stop includes perforated sections that create a hinge line in the material, allowing bending or rotation relative to the bracket body. The perforated sections include small, precisely spaced holes enabling the head stop to bend or fold into position. The bracket body and head stop form a gap at their intersection, creating a natural hinge point for bending the head stop. The head stop includes punched holes for attaching to vertical guides and additional head stops. The bracket body includes a bracket opening to receive an axle, a bracket stop cap, a tensioning drive, and guide tabs. The bracket body integrating the head stop reduces installation complexity and improves reliability compared to traditional separate component configurations.

20 Claims, 7 Drawing Sheets

(56) References Cited

U.S. PATENT DOCUMENTS

| | | | | |
|---|---|---|---|---|
| 12,264,523 | B2 * | 4/2025 | Bruckelmyer | E05D 15/22 |
| 2007/0079943 | A1 | 4/2007 | Smith et al. | |
| 2024/0200403 | A1 | 6/2024 | Humphrey et al. | |
| 2024/0376758 | A1 | 11/2024 | Feng | |
| 2025/0043626 | A1 * | 2/2025 | Vangberg-Brinkmann | F16C 25/02 |
| 2025/0059827 | A1 | 2/2025 | Nakoff et al. | |

* cited by examiner

INTEGRATED BRACKET ASSEMBLY WITH HEAD STOP FOR OVERHEAD DOORS

BACKGROUND OF THE INVENTION

Field of the Invention

The present invention relates generally to bracket assemblies for overhead door systems, and in particular, relates to an integrated bracket assembly with a built-in head stop for securing and controlling the movement of flexible door panels in roll-up and sectional overhead doors.

Description of the Prior Art

Roll-up doors are widely used in industrial and commercial settings due to their ease of operation and space-saving design. The roll-up doors provide secure and convenient access to enclosed spaces. The roll-up doors typically feature flexible door panels that move vertically along guide tracks to open and close entryways. These door systems commonly employ tensioning mechanisms to maintain proper door operation and counterbalance systems to assist in door movement. The structural integrity and proper alignment of these components are critical for safe and efficient door operation.

FIG. 1 and FIG. 2 show a perspective view and an exploded view, respectively, of a roll-up door system 10, in accordance with one exemplary embodiment in prior art. Roll-up door system 10 includes a roll-up door 12. Roll-up door 12 is formed from a metal sheet having multiple corrugations with horizontal hems. Roll-up door 12 selectively moves from a closed position as depicted in FIG. 1 to an open position (not shown) where roll-up door 12 is fully retracted and coiled about a plurality of drum wheels (not shown). The drum wheels attach to an axle 14 (FIG. 2) that rotatably supports a header (not shown) in a position above the opening. Axle 14 receives a tension spring or torsion spring 16. Further, roll-up door system 10 includes a tensioning bracket 18 that mounts at a side of roll-up door 12. FIG. 3 shows a front view of tensioning bracket 18, in accordance with prior art. Tensioning bracket 18 includes a bracket opening 28 that receives a bracket stop 20. Furthermore, tensioning bracket 18 includes a worm screw or tensioning drive 22. Tensioning drive 22 is positioned in an indentation of tensioning bracket 18 and held in place. Tension adjustments of tensioning bracket 18 are easily made and set by turning tensioning drive 22.

Further, roll-up door system 10 includes a head stop 24. Head stop 24 helps position bracket 18 and common roll-up door system components. As known, head stop 24 limits roll-up door's 12 travel when it's being opened, and helps to prevent roll-up door 12 from swinging too far and potentially damaging itself, surrounding structures, or causing injury. Typically, head stop 24 comes as a separate component and is connected to vertical guides 26 on both sides that receive roll-up door 12. Head stop 24 is connected to vertical guides 26 using fasteners 25, as indicated in FIG. 2. Specifically, head stop 24 comes as a separate component that requires attachment to vertical guides 26 using additional fasteners 25. This separate component approach necessitates precise alignment during installation and creates multiple connection points that may be subject to loosening over time due to operational vibrations. Further, tensioning bracket 18 includes holes 30 for securing the head stop to the bracket. Tensioning bracket 18 also includes guide tabs 32 that align and connect the bracket to the vertical guides ensuring proper positioning during installation. Tensioning bracket 18 includes a folded hem 34 that adds structural rigidity while eliminating sharp edges for improved safety during handling and installation.

Several roll-up door systems in prior art disclosed different types of head stops used to connect to vertical guides. One such example is disclosed in a PCT Publication No. 2023122318, entitled "Roll up door spring tensioning device" ("the '318 Publication"). The '318 Publication discloses a roll up door tensioning device comprising a bracket having a first door side and a second outer side connects an axle to a support structure. A spring plate on the bracket second outer side has an inner circumference fixedly attached to a collared bearing assembly for rotatably supporting an axle through the bracket. The spring plate is fixedly attached to a tensioning wheel on the bracket first door side. A tensioning wheel on the bracket first door side forms a drive stop mechanism with a tensioning drive.

Another example is disclosed in a United States Publication No. 20240200403, entitled "Rollup door tension device" ("the '403 Publication"). The '403 Publication discloses vertical guides having a head stop at the height about below a door package assembly. The head stop works as to secure the vertical guides to the wall. The head stop has a square with chamfered corners, and the one side of the head stop is opened to embrace a vertical guide. The end of the opened side has a little curved into the head stop so the head stop can catch the vertical guides.

Yet another example is disclosed in a U.S. Pat. No. 7,017,644, entitled "Multipurpose connection console for material handling gate" ("the '644 Patent"). The '644 Patent") discloses a goods-handling door incorporating a bracket on each side of its top portion. The brackets support a shaft for rolling up the door. The invention introduces a one-piece, molded bracket that offers multiple functions: guiding the curtain, fixing various accessories, thereby ensuring structural precision and easy maintenance.

Although the above discussed disclosures are useful, they still have problems and present incomplete solutions. The use of separate head stops increases installation complexity and time, requiring technicians to align and secure additional parts with multiple fasteners. Each connection point introduces a potential failure location where fasteners loosen over time due to door vibration and movement. Further, improper installation of separate head stops frequently occurs in field applications, leading to misalignment issues, premature component wear, and potential safety hazards. For instance, failure to properly install the head stops may result in the roll-up door to travel beyond the vertical guides resulting in damage to the roll-up door and/or personal injury. When installers rush or lack proper training, they incorrectly position the head stop or use insufficient fasteners, compromising the door system's reliability and performance.

Therefore, there is a need in the art to provide an improved bracket assembly that integrates a head stop directly into a bracket body and reduces parts count, simplifies installation, improves reliability, and lowers manufacturing costs while eliminating the separate fasteners and alignment challenges associated with conventional multi-component assemblies.

SUMMARY OF THE INVENTION

It is an object of the present invention to provide a bracket assembly for a roll-up door system that integrates a head stop with a bracket body.

It is another object of the present invention to provide a head stop with perforated sections or indents or scored lines or integrated flex features that allow bending or rotation of the head stop relative to the bracket body.

It is another object of the present invention to provide a bracket assembly with multiple punched holes for attaching additional head stops and/or securing the head stop to vertical guides.

In order to achieve one or more objectives, the present invention provides a bracket assembly for a roll-up door system. The bracket assembly includes a bracket body and a head stop extending from a bottom portion of the bracket body. The head stop is configured to limit travel of a roll-up door. The head stop is directly incorporated, manufactured, welded, stamped, molded, or otherwise permanently attached to the bracket body without the use of fasteners, bolts, staples, or other attachment devices. The head stop includes a plurality of perforated sections or indents or scored lines or integrated flex features that create a predetermined hinge line to allow bending or rotation of the head stop relative to the bracket body. The perforated sections include a series of small, precisely spaced holes that allow the head stop to bend or fold into position without using fasteners. The bracket body and the head stop form a gap at their intersection to create a natural hinge point for positioning the head stop.

In one aspect of the present invention, the head stop includes multiple sets of punched holes i.e., first punched holes, second punched holes, and third punched holes. The first punched holes position away from the perforated sections. The first punched holes receive fasteners to secure the head stop to vertical guides. The second punched holes position adjacent to the perforated sections and opposite the first punched holes. The second punched holes are configured to receive fasteners to attach additional head stops. The third punched holes position adjacent to the perforated sections and perpendicular to the first and second punched holes. The third punched holes are configured to receive fasteners to attach additional head stops, allowing for different door opening heights.

In one aspect of the invention, two or more head stops may be integrated into the bracket body.

In another aspect of the invention, the bracket body includes a plurality of guide tabs configured to connect the bracket body to vertical guides, guide rails, or any other vertical or horizontal guide/track support system of the roll-up door system. The bracket assembly can be used with various tensioning systems including, but not limited to, ratchet and pawl, worm screw and worm wheel, Geneva wheel and drive wheel, ratchet assembly, worm drive, drive gear, or cam ratchet, as well as non-tensioning bracket systems.

The present invention also provides a method of providing a bracket assembly for a roll-up door system. The method includes providing a bracket body, providing a head stop integrally formed with the bracket body and extending from the bracket body to limit travel of a roll-up door, and providing a plurality of perforated sections positioned on the head stop. The perforated sections create a hinge line in the material of the head stop to allow bending or rotation of the head stop relative to the bracket body. The bracket assembly secures a moveable panel, curtain, sheet, flexible material, or material that allows for a passable entry or exit, which can be composed of various materials including, but not limited to, metal, fiberglass, wood, plastic, fabric, glass, flexible material, or a combination thereof.

In one advantageous feature of the present invention, the integrated bracket assembly with head stop significantly reduces installation time and complexity by eliminating separate components and fasteners. The unified design allows quicker and more accurate positioning of the head stop during installation. Further, the unified design eliminates the need for separate fabrication and mechanical fastening (e.g., bolts, clips, rivets), reducing the risk of improper installation, which could lead to misalignment issues, premature component wear, and potential safety hazards.

In another advantageous feature of the present invention, the perforated sections on the head stop provide enhanced flexibility for adjusting the head stop position without compromising structural integrity. The perforated sections allow installers to fine-tune the door's upper travel limit on-site without requiring additional tools or components. The bracket assembly can have additional holes punched into it to allow different operating systems to attach to the bracket assembly.

In yet another advantageous feature of the present invention, the multiple punched holes on the head stop offer versatility for mounting configurations. This design may accommodate various door sizes and installation requirements, potentially reducing the need for multiple bracket models in inventory. The additional holes or mounting features can be punched or attached into, onto, or next to the tensioning bracket and/or non-tensioning bracket during the initial manufacturing process, post-manufacturing, pre-installation, and/or post-installation to allow for additional brackets, mounts, and/or tensioners to be separately or additionally added to the bracket assembly.

In a further advantageous feature of the present invention, the unitary construction of the bracket body and head stop enhances overall system reliability by reducing the number of potential failure points. This integrated design eliminates connection points where fasteners might loosen over time due to door vibration and movement, thereby improving reliability and extending the service life of both the roll-up door and the bracket assembly.

These and other objects of the present invention will be apparent from review of the following specification and the accompanying drawings.

DETAILED DESCRIPTION OF THE PREFERRED EMBODIMENT

Figure 1:
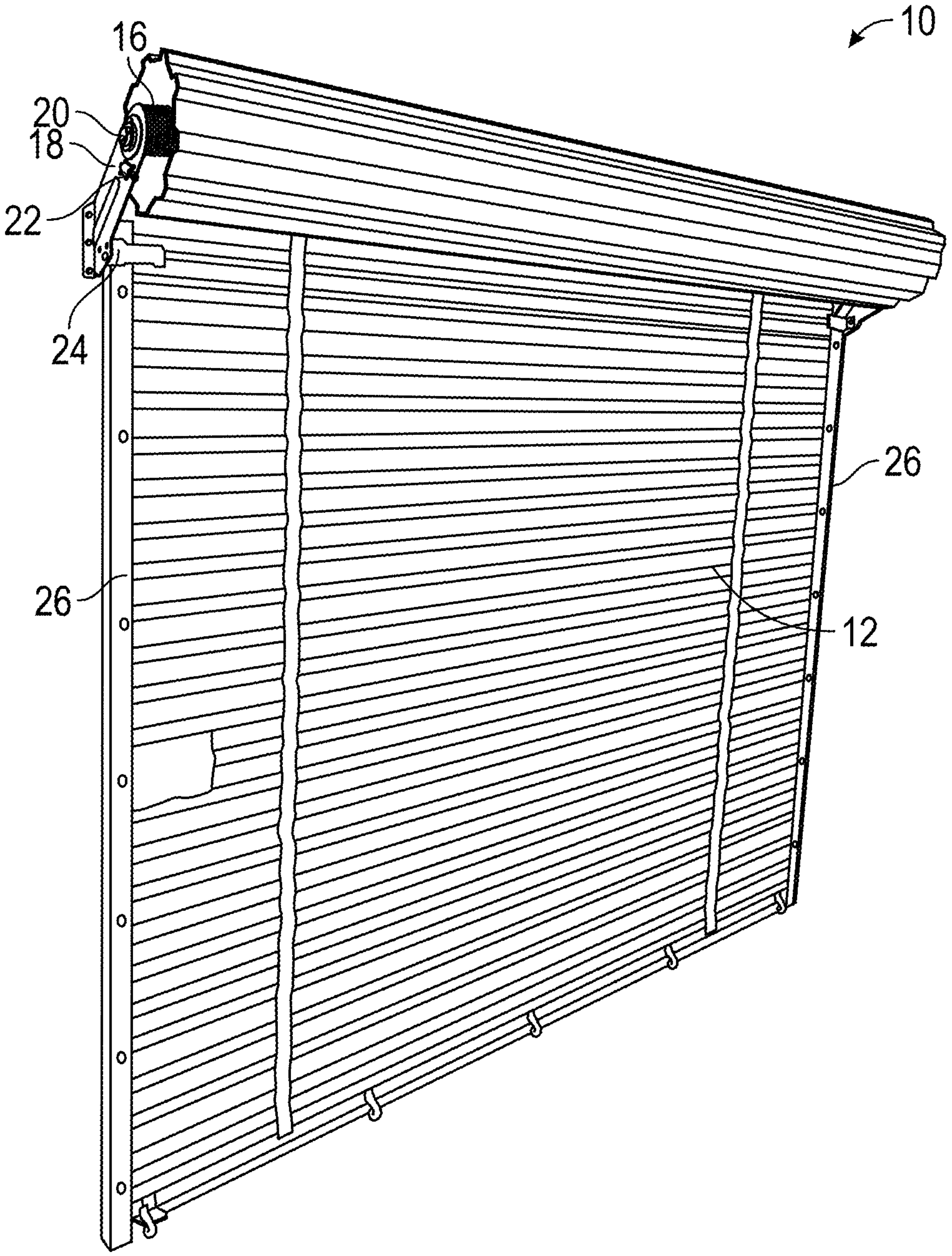
FIG. 1 (Prior Art)
FIG. 1 and FIG. 2 illustrate a perspective view and an exploded view, respectively, of a roll-up door system, in accordance with prior art.
Figure 3:
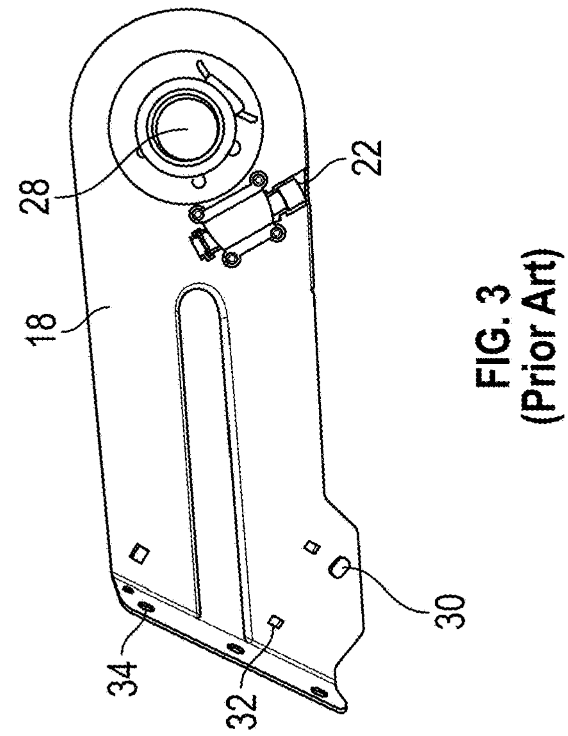
FIG. 3 (Prior Art)
FIG. 3 illustrates a tensioning bracket, in accordance with prior art.
Figure 2:
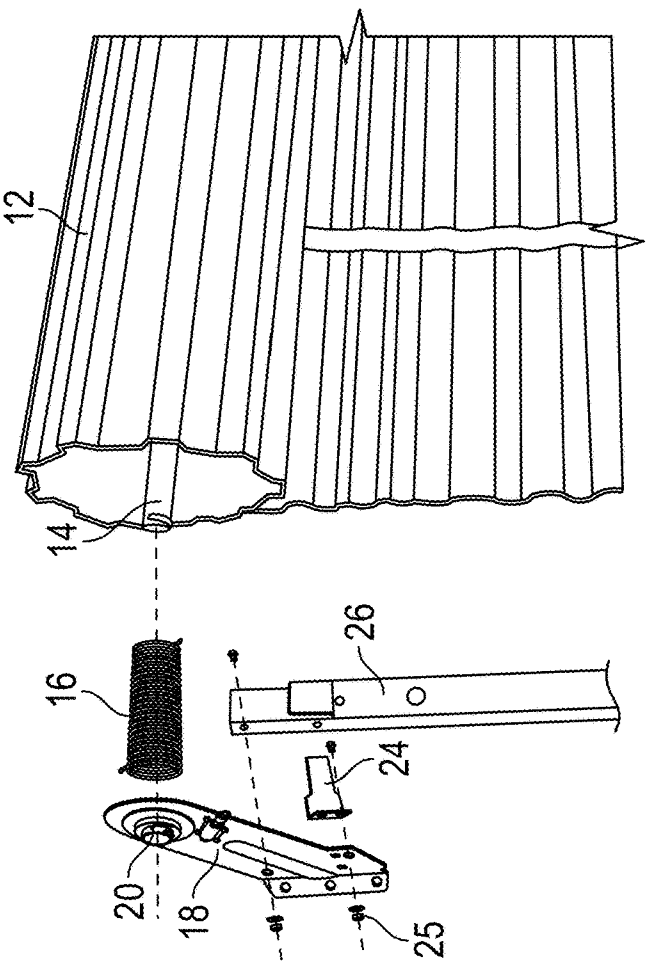
FIG. 2 (Prior Art)

The following detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed bracket assembly. However, it will be apparent to those skilled in the art that the presently disclosed invention may be practiced without these specific details. In some instances, well-known structures and devices are shown in functional or conceptual diagram form in order to avoid obscuring the concepts of the presently disclosed bracket assembly.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

It will be understood that, although the terms first, second, third, etc. may be used herein to describe various elements, components, regions, and/or sections, these elements, components, regions, and/or sections should not be limited by these terms. These terms are only used to distinguish one element, component, region, and/or section from another element, component, region, and/or section.

It will be understood that the elements, components, regions, and sections depicted in the figures are not necessarily drawn to scale.

Although the present invention provides a description of a bracket assembly, it is to be further understood that numerous changes may arise in the details of the embodiments of the bracket assembly. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

Various features and embodiments of a bracket assembly are explained in conjunction with the description of FIGS. 4-10B.

Figure 4:
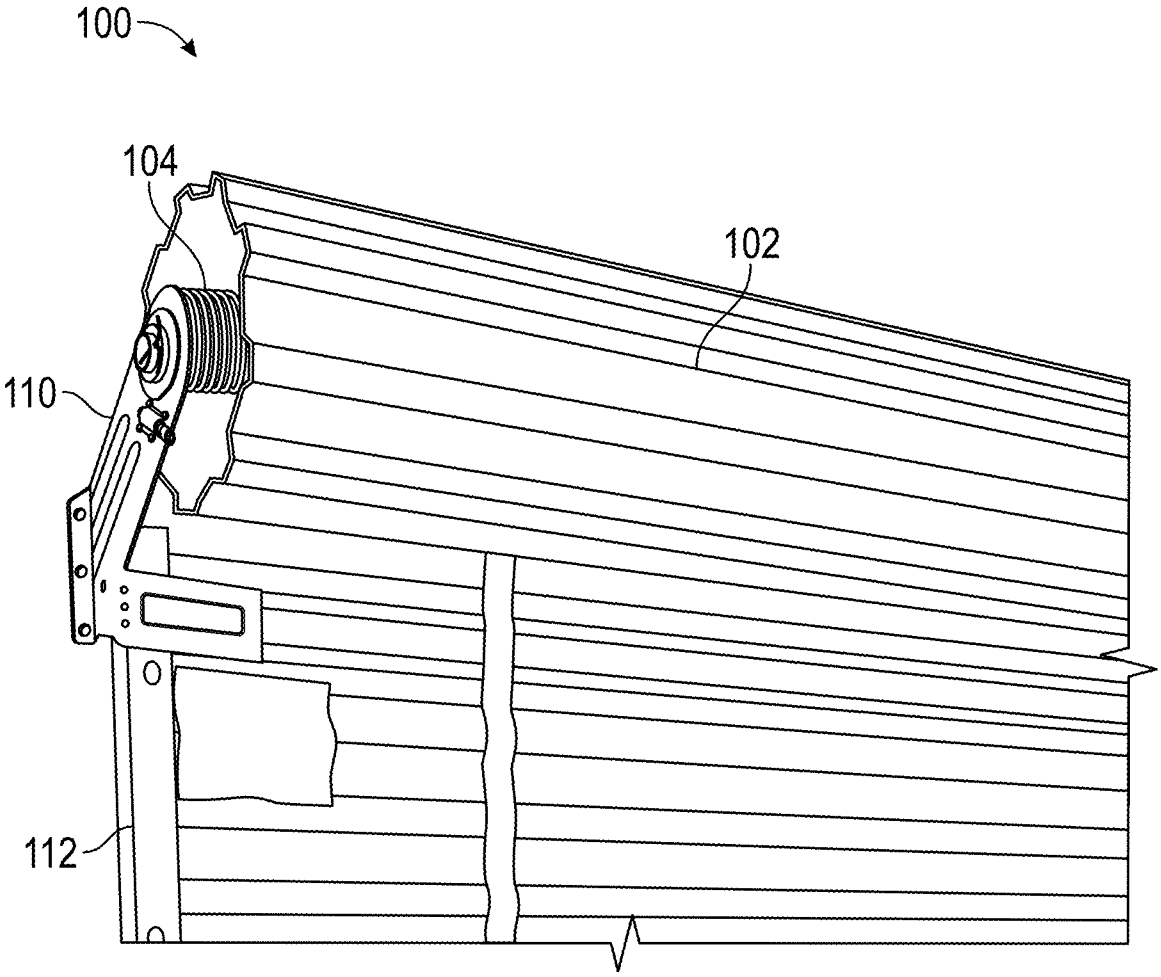
FIG. 4 illustrates a perspective view of a roll-up door system incorporating a bracket assembly, in accordance with one embodiment of the present invention.
Figure 6:
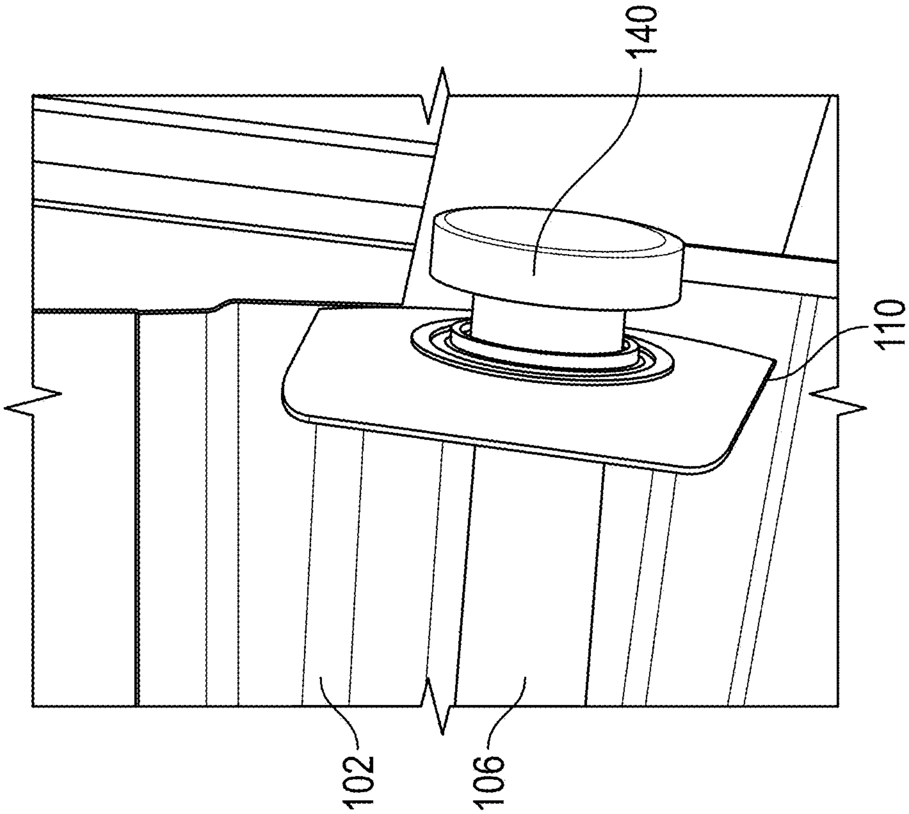
FIG. 6 illustrates a bracket stop connected to an axle of the roll-up door system, in accordance with one embodiment of the present invention.

FIG. 4 shows a roll-up door system 100 incorporating a bracket assembly 110, in accordance with one exemplary embodiment of the present invention. Roll-up door system 100 includes a roll-up door 102. Roll-up door 102 is formed from a metal sheet having multiple corrugations with horizontal hems. Roll-up door 102 selectively moves from a closed position as depicted in FIG. 4 to an open position (not shown) where roll-up door 102 is fully retracted and coiled about a plurality of drum wheels (not shown). The drum wheels are attached to an axle 106 (as illustrated in FIG. 6) that is configured to rotatably support a header (not shown) in a position above the opening. The axle receives a tension spring or torsion spring 104. Further, roll-up door system 100 includes a bracket assembly 110 that mounts at a side of roll-up door 102. Here, bracket assembly 110 removably connects to vertical guides 112.

Figure 5:
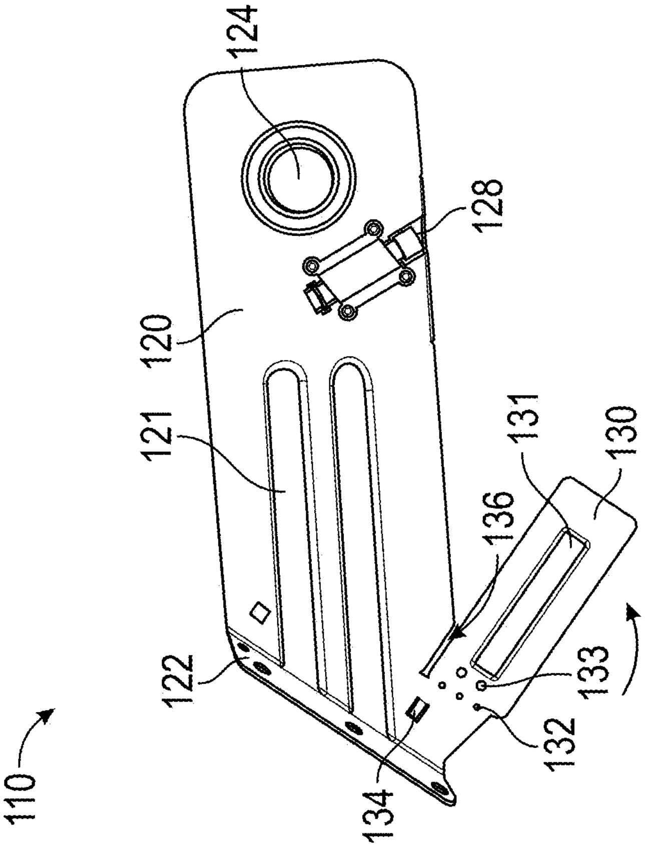
FIG. 5 illustrates a front view of a bracket assembly with an integrated head stop, in accordance with one embodiment of the present invention.

FIG. 5 shows a front view of bracket assembly 110, in accordance with one embodiment of the present invention. Bracket assembly 110 includes a bracket body 120. Bracket body 120 includes a plurality of first stiffening members or first stiffeners 121. In one example, plurality of first stiffening members 121 include two first stiffening members 121. Here, first stiffening members 121 are embossed in bracket body 120. Plurality of first stiffening members 121 extend from folded hem 122 of bracket body 120. Folded hem 122 forms/stamps around the perimeter of bracket body 120. Folded hem 122 adds rigidity and enhances operator safety during installation and operation. Folded hem 122 includes bolt holds (i.e., openings formed in folded hem 122) for connecting bracket body 120 to the header or a support structure (not shown) above the header to mount, raise (roll), and lower (unroll) roll-up door 102.

Figure 7:
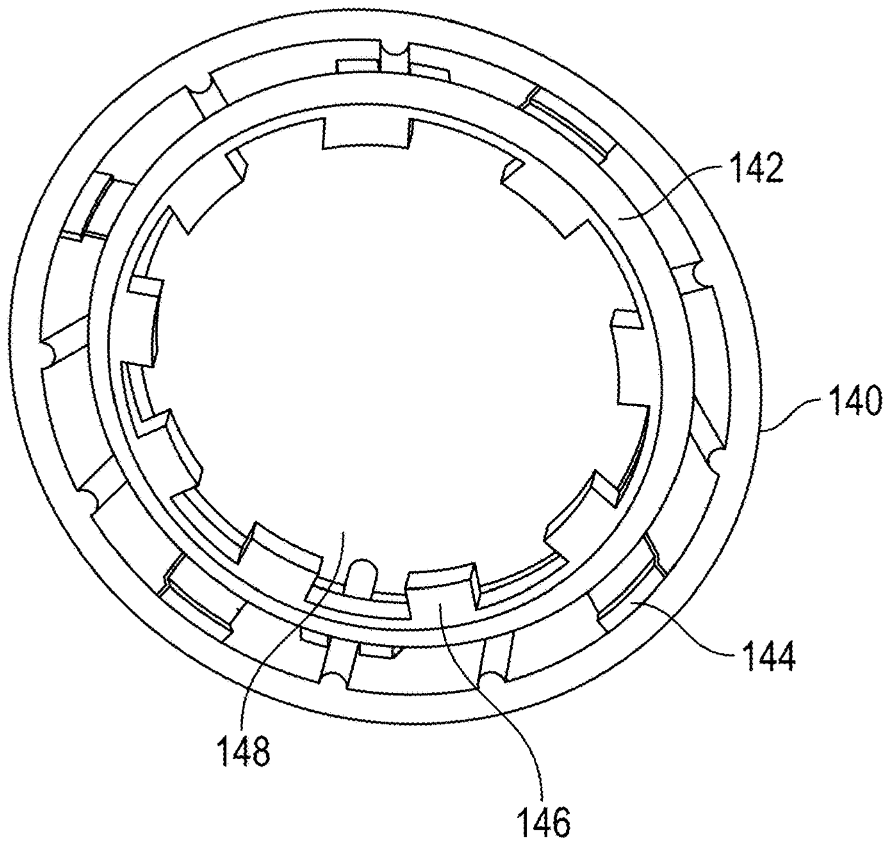
FIG. 7 illustrates the bracket stop, in accordance with one embodiment of the present invention.

Bracket body 120 includes a bracket opening 124 that receives axle 106 to which bracket stop 140 connects to (as illustrated in FIG. 6) Here, bracket opening 124 indicates a circumferential hole formed in bracket body 120 through which axle 106 passes to allow attachment tabs (not shown) and a tensioning wheel (not shown) to rotate freely. FIG. 6 shows the feature of axle 106 going through bracket opening 124 of bracket body 120 and bracket stop 140 attached at a distal end of axle 106. In the present embodiment, the bracket stop or cap 140 serves as a depth stop for accurate axle pipe positioning and as a safety cover, eliminating the need for drilled holes or cotter pins. FIG. 7 shows the front view of bracket stop 140, in accordance with one embodiment of the present invention. As can be seen, bracket stop 140 includes an inner rim 142. Inner rim 142 comes in a circular configuration and encompasses tabs 144. Tabs 144 are formed or attached on inner rim 142. Tabs 144 are used to secure threaded connections/self-threading fastener/push-on mechanisms with lock or retaining rings inside or on bracket stop 140. Inner rim 142 forms an axle receiving portion 148. Axle receiving portion 148 defines an area or space for receiving axle 106. In one implementation, inner rim 142 encompasses teeth 146 facing axle receiving portion 148. Teeth 146 as retainer ring for holding axle 106 in place when bracket stop 140 is secured at the distal end of axle 106.

Bracket stop 140 attaches permanently or removably to the axle pipe 106 using various methods, including, but not limited to, threaded connections, self-threading washers, push-on mechanisms with lock or retaining rings, screws, nails, or adhesives. This allows for easy installation and removal during maintenance while ensuring the bracket stop remains securely fixed during door operation. Further, the bracket stop 140 acts as a depth gauge, limiter, and locator. The bracket stop 140 precisely positions bracket body 120 on axle 106, ensuring sufficient clearance for side-to-side movement without binding between the door panel and stopping mechanism during normal operation. In other words, bracket stop 140 is used as a depth locator on axle 106 to ensure bracket 110 can only move the required distance on axle 106. The precise positioning helps in smooth door function and longevity of components.

Additionally, bracket stop 140 secures bracket body 120 on axle 106, preventing it from sliding off. This eliminates the need for traditional fastening methods like cotter pins, nails, or screws inserted through drilled holes in the axle. By removing the requirement for the additional fasteners, bracket stop 140 simplifies installation and reduces potential points of failure.

Further, bracket stop 140 eliminates risks associated with traditional mounting methods. Bracket stop 140 removes the possibility of improper hole placement when drilling, cutting, or punching holes in the axle. This prevents weakening of the axle structure and ensures consistent, reliable mounting across installations. Furthermore, bracket stop 140 preserves the structural integrity of axle 106 and reduces the risk of corrosion or fatigue at fastener points by eliminating the need for the additional holes.

Referring back to FIG. 5, bracket body 120 includes a worm screw or tensioning drive 128. Tensioning drive 128 positions in an indentation of tensioning bracket 18 and holds in place. Turning tensioning drive 128 easily makes and sets tension adjustments of bracket body 120. The tensioning system can include but is not limited to ratchet and pawl, worm screw and worm wheel, Geneva wheel and drive wheel, ratchet assembly, worm drive, drive gear, or cam ratchet mechanisms.

In accordance with the present embodiment, bracket assembly 110 includes a head stop 130 that directly incorporates, manufactures, stamps, welds, molds, or permanently attaches to bracket body 120 without the use of fasteners, bolts, staples or other attachment devices. The integration may be achieved through various manufacturing processes including progressive stamping, where bracket body 120 and head stop 130 form from a single piece of material in sequential operations, or through welding, brazing, or other permanent joining methods that create a unitary structure. Head stop 130 comes in a rectangular, square, triangular, or any other shape. The shape of head stop 130 may be optimized based on the specific door application, load requirements, and installation constraints. Head stop 130 extends at the bottom of bracket body 120. Head stop 130 encompasses a second stiffening member or second stiffener 131 extending along the length of head stop 130. Here, second stiffening member 131 is embossed in head stop 130. Second stiffening member 131 provides required strength for retaining the shape of head stop 130.

Head stop 130 includes a plurality of perforated sections 132. Perforated sections 132 indicate a series of small, precisely spaced holes that create a hinge line in the material of head stop 130. The pattern of perforated sections 132 may be customized based on material thickness, desired bending radius, and required strength characteristics. Head stop 130 adjusts through bending or rotation at perforated sections 132. In one example, perforated sections 132 may be replaced by indents or scored lines or integrated flex features that create a predetermined hinge line to allow bending or rotation of head stop 130 relative to bracket body 120.

Further, head stop 130 includes a plurality of punched holes 133. Punched holes 133 are slots provided in various shapes and sizes to accommodate various fastener types. Here, punched holes 133 position away from perforated sections 132. Punched holes 133 are configured to receive fasteners (not shown) to secure head stop 130 to vertical guides or guide rails 112 once head stop 130 bends into position.

In some cases, head stop 130 presents a gap 136 at the intersection with bracket body 120. Gap 136 allows bending of head stop 130 with respect to bracket body 120. In other words, gap 136 creates a natural hinge point that facilitates precise positioning without requiring additional components. Gap 136 may be formed during the initial manufacturing process or created through subsequent machining operations, and its dimensions may be optimized to provide the desired bending characteristics while maintaining structural integrity. FIG. 4 shows the feature of head stop 130 bent with respect to bracket body 120 to limit the travel of roll-up door 102.

In some cases, bracket body 120 includes a plurality of guide tabs 134. Guide tabs 134 may be formed integrally with bracket body 120. Guide tabs 134 help connect bracket body 120 and common components of roll-up door system 100 to vertical guides 112.

Bracket assembly 110 including bracket body 120 and head stop 130 formed from metal such as steel, aluminum, or other rigid materials capable of withstanding repeated mechanical stress. The material selection may be optimized based on environmental conditions, load requirements, and cost considerations. Steel provides high strength and durability, while aluminum offers corrosion resistance and lighter weight. Other materials such as stainless steel, galvanized steel, or composite materials may be used for specific applications. In some cases, bracket assembly 110 is manufactured by stamping, molding, or casting to create a unitary structure with precise dimensions. Progressive stamping allows for high-volume production with consistent quality, while casting may be preferred for complex geometries or specialized material requirements. The integrated design of bracket assembly 110 with head stop 130 provides a unified structure that controls and supports roll-up door 102. This configuration eliminates the need for fasteners to connect head stop 130 to bracket assembly 110. Further, the integrated bracket assembly 110 simplifies installation and maintenance procedures. Furthermore, the unitary construction reduces the risk of component misalignment during installation and prevents loosening of connections over time due to door vibration and movement. Additionally, the integrated bracket assembly 110 reduces inventory management challenges by consolidating multiple parts into a single component. Bracket assembly 110 can be used with overhead doors, flexible doors, vertical moving walls and/or pass-through entryways, providing versatility across different door system types and applications.

An operator (not shown) bends head stop 130 using a known or specialized tool (not shown). The tool applies force to head stop 130, causing it to bend at perforated sections 132. Perforated sections 132, containing small, evenly spaced holes, form a hinge line in head stop 130's material. This hinge line allows head stop 130 to bend or rotate relative to bracket body 120. After bending, head stop 130 sits at about a right angle i.e., becoming perpendicularly to bracket body 120, as shown in FIG. 4. Here, gap 136 helps with bending by creating a natural hinge point. This design allows precise placement of head stop 130 without extra parts. The bent head stop 130 stops roll-up door 102 from moving too far upward. The bent head stop 130 creates a physical barrier that prevents roll-up door 102 from extending too much when opening. This keeps roll-up door 102 properly aligned in vertical guides 112 and prevents damage to the door and nearby structures. As specified above, bracket assembly 110's design directly joins head stop 130 directly to bracket body 120, creating an adjustable stop without separate fasteners or parts. This one-piece construction makes roll-up door system 100 more durable and reliable by reducing possible failure points and removing connections that might loosen from door vibration and movement.

Figure 8:
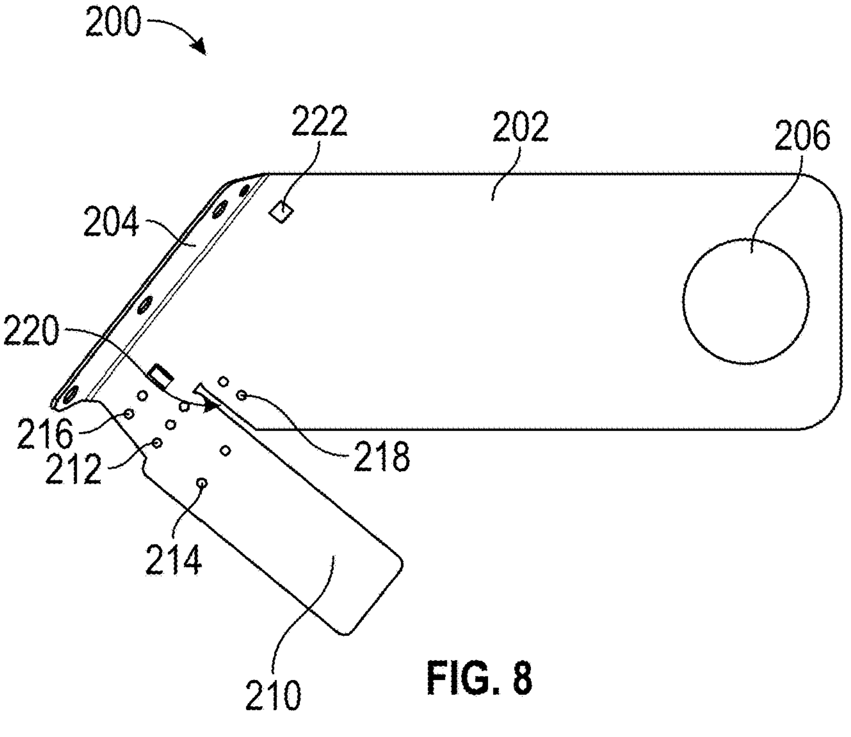
FIG. 8 illustrates a front view of another bracket assembly with an integrated head stop, in accordance with another embodiment of the present invention.

FIG. 8 shows a front view of a bracket assembly 200, in accordance with another embodiment of the present invention. Bracket assembly 200 includes a bracket body 202. Bracket assembly 200 is constructed from stamped steel or die-cast aluminum or other materials with a thickness sufficient to withstand operational stresses. Bracket assembly 200 includes a bracket body 202. Bracket body 202 includes a folded hem 204. Folded hem 204 is formed/stamped around the perimeter of bracket body 202. Folded hem 204 adds rigidity and enhances operator safety during installation and operation. Folded hem 204 has bolt holes (i.e., openings formed in folded hem 204) for connecting bracket body 202 to the header or a support structure (not shown) above the header to mount, raise (roll), and lower (unroll) roll-up door 102. Bracket body 202 includes a bracket opening 206 that receives an axle (not shown) to which a bracket stop (not shown) connects to. Here, bracket opening 206 indicates a circumferential hole formed in bracket body 202 through which the axle passes to allow attachment tabs (not shown) and a tensioning wheel (not shown) to rotate freely. In the present embodiment, the bracket stop is a cap that uses a retaining ring, self-cutting/threading fastener to secure bracket body 202 within/on the axle. This ensures that bracket body 202 can only move the required space on the axle. Here, the bracket stop/cap acts as a safety cover during installation and adjustments to protect the operator from injury. Further, the bracket stop removes the need to drill holes in axle 106 and use a cotter pin or other fasteners to secure bracket body 202 on the axle.

In accordance with the present embodiment, bracket assembly 200 includes a head stop 210 that directly incorporates, manufactures, stamps, molds, or permanently attaches to bracket body 202 without the use of fasteners, bolts, staples or other attachment devices. Head stop 210 comes in a rectangular, square, triangular, or any other shape. Head stop 210 extends at the bottom of bracket body 202. Here, head stop 210 extends from the bracket body 202, forming a continuous piece with the main structure and eliminating potential failure points that exist with separate components. Head stop 210 includes a plurality of perforated sections 212. Perforated sections 212 indicate a series of small, precisely spaced holes that create a hinge line in the material of head stop 210. Head stop 210 adjusts through bending or rotation at perforated sections 212. In other words, perforated sections 212 allow head stop 210 to bend or fold into position, creating a living hinge effect that maintains structural integrity while enabling adjustment.

Further, head stop 210 includes a plurality of first punched holes 214. First punched holes 214 are circular or slotted to accommodate various fastener types. Here, first punched holes 214 position away from perforated sections 212. First punched holes 214 are configured to receive fasteners (not shown) to secure head stop 210 to vertical guides or guide rails 112 once head stop 210 bends into position.

Further, head stop 210 includes a plurality of second punched holes 216. Second punched holes 216 are circular or slotted to accommodate various fastener types. Second punched holes 216 position adjacent to perforated sections 212 and opposite first punched holes 214. Second punched holes 216 attach additional head stops (not shown) allowing for different door opening heights and different operating systems.

Furthermore, head stop 210 includes a plurality of third punched holes 218. Third punched holes 218 position adjacent to perforated sections 212 and perpendicularly to first punched holes 214 and second punched holes 216. Third punched holes 218 attach additional head stops (not shown) allowing for different door opening heights and different operating systems. Second punched holes 216 and third punched holes 218 allow customization based on specific installation requirements and can be punched during the initial manufacturing process, post-manufacturing, pre-installation, and/or post installation.

Bracket assembly 200 offers flexibility in installation and configuration. The integrated head stop 210 simplifies the initial setup and punched holes 214, 216, 218 allow customization based on specific door system requirements. The unitary construction eliminates separate head stop components and their associated fasteners, reducing installation time and minimizing the risk of component failure due to vibration or improper assembly. The strategic placement of mounting holes enables secure attachment while maintaining the structural integrity of the assembly. Bracket assembly 200 can have multiple head stops directly manufactured into the bracket for overhead doors, allowing for different door opening heights.

In addition, head stop 210 presents a gap 220 at the intersection with bracket body 202. Gap 220 allows bending of head stop 210 with respect to bracket body 202. In other words, gap 220 creates a natural hinge point that facilitates precise positioning without requiring additional components.

In some cases, bracket body 202 includes a plurality of guide tabs 222. Guide tabs 222 help to connect bracket body 202 and common components of roll-up door system 100 to vertical guides 112.

Figure 9:
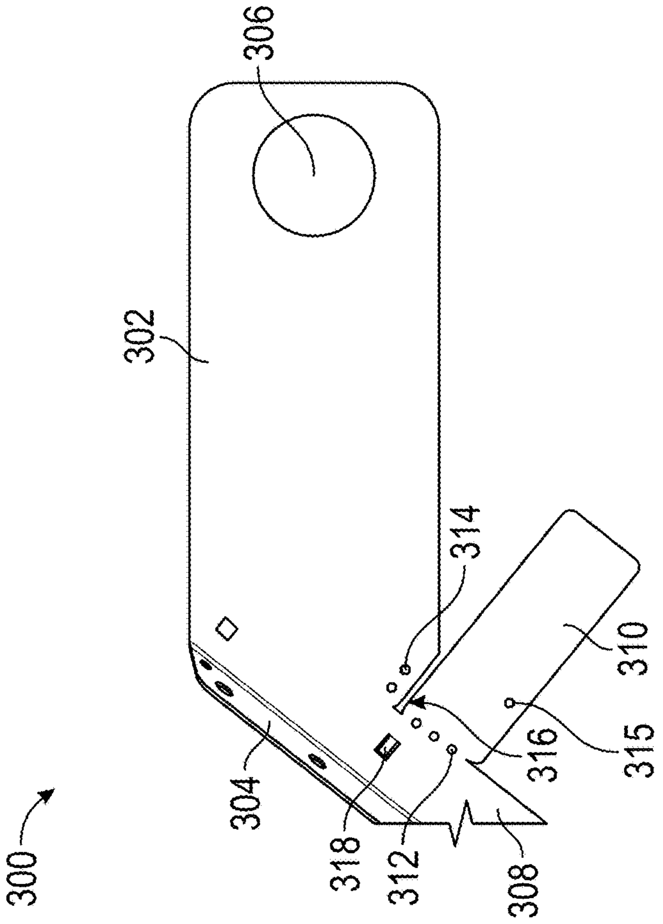
FIG. 9 illustrates a front view of a bracket assembly with an extending section and a head stop, in accordance with another embodiment of the present invention.

FIG. 9 shows a front view of a bracket assembly 300 with an extended section 308 having a head stop 310 that directly incorporates, manufactures, stamps, molds, or permanently attaches to extending section 308 without the use of fasteners, bolts, staples or other attachment devices, in accordance with another embodiment of the present invention. Bracket assembly 300 includes a bracket body 302. Bracket body 302 includes a folded hem 304. Bracket body 302 includes a bracket opening 306 that receives an axle (not shown) to which a bracket stop (not shown) connects to (not shown). Bracket body 302 has an extending section 308 that extends below bracket body 302, creating an L-shaped or angled profile that provides additional mounting options.

In the present embodiment, extending section 308 includes a head stop 310. Head stop 310 extends from extending section 308 and positions below bracket body 302. Head stop 310 includes a plurality of perforated sections 312. Perforated sections 312 indicate a series of small, precisely spaced holes that create a hinge line in the material of head stop 310. Head stop 310 adjusts through bending or rotation at perforated sections 312. In other words, perforated sections 312 allow head stop 310 to bend or fold into position.

Further, head stop 310 includes at least one first punched hole 315. First punched hole 315 is circular or slotted to accommodate various fastener types. Here, first punched hole 315 positions away from perforated sections 312. First punched hole 315 receives a fastener (not shown) to secure head stop 310 to vertical guides or guide rails 112 once head stop 310 bends into position.

Additionally, head stop 310 includes a plurality of second punched holes 314. Second punched holes 314 position adjacent and perpendicularly to perforated sections 312. Second punched holes 314 attach additional head stops (not shown) allowing for different door opening heights and different operating systems. Second punched holes 314 allow customization based on specific installation requirements.

Further, head stop 310 presents a gap 316 at the intersection with bracket body 302. Gap 316 allows for bending of head stop 310 with respect to bracket body 302. In other words, gap 316 creates a natural hinge point that facilitates precise positioning without requiring additional components. Furthermore, bracket body 302 includes a plurality of guide tabs 318. Guide tabs 318 help to connect bracket body 302 and common components of roll-up door system 100 to vertical guides 112.

Bracket assembly 300 design offers advantages in certain door configurations. The lower positioning of head stop 310 provides better control of door movement in some installations. The extended configuration may be particularly beneficial for high-clearance doors or installations where the head stop needs to be positioned away from other door components. The integrated construction eliminates the need for separate components and fasteners, reducing installation complexity and potential failure points. Extending section 308 is provided to support larger and heavier doors. The strategic placement of head stop 310 relative to bracket body 302 optimizes the force distribution during door operation, extending the service life of both roll-up door 102 and bracket assembly 300. The extended design also provides improved access for maintenance and adjustment operations.

Figure 10A:
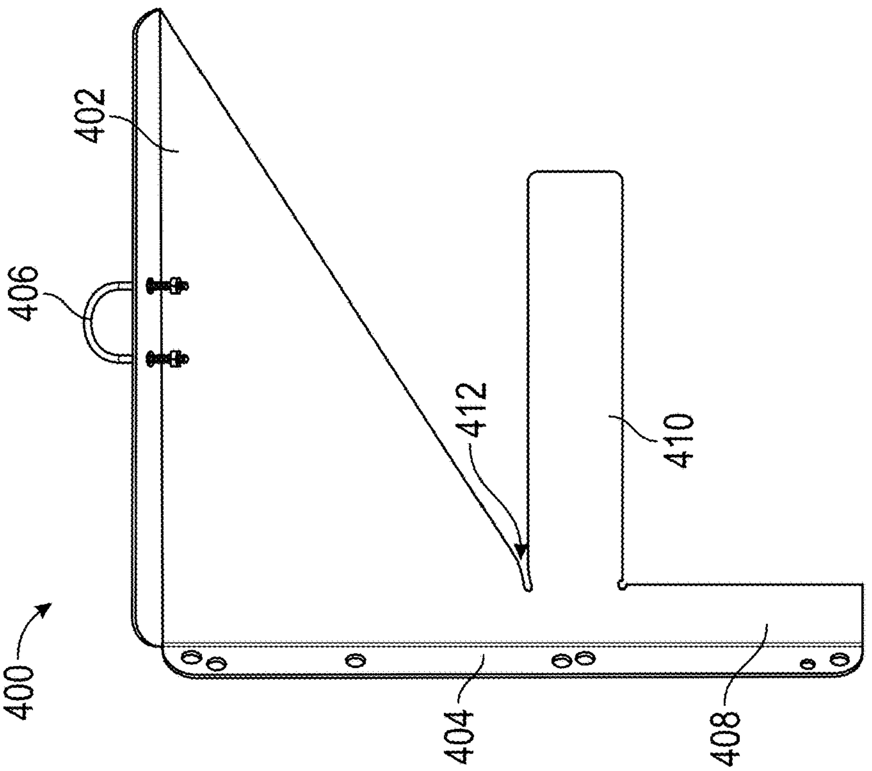
FIG. 10A and FIG. 10B illustrate a door operator bracket assembly with, and without an extension, respectively, in accordance with another embodiment of the present invention.

FIG. 10A shows a front view of a door operator bracket assembly 400 with an extended section 408 having a head stop 410, in accordance with yet another embodiment of the present invention. Bracket assembly 400 includes a bracket body 402. Bracket body 402 includes a folded hem 404. Bracket body 402 includes a U-shaped member 406 at the top. U-shaped member 406 clamps onto axle 106 of roll-up door system 100. Bracket body 402 has an extending section 408 that extends below the main body, creating an L-shaped or angled profile, which provides additional mounting options. Extending section 408 is provided to support larger and heavier doors. In the present embodiment, extending section 408 includes a head stop 410 that directly incorporates, manufactures, stamps, molds, or permanently attaches to extending section 408 without the use of fasteners, bolts, staples or other attachment devices. Head stop 410 extends from extending section 408 and positions below bracket body 402. Head stop 410 presents a gap 412 at the intersection with bracket body 402 and/or extending section 408. Gap 412 allows for bending of head stop 410 with respect to bracket body 402. In other words, gap 412 creates a natural hinge point that facilitates precise positioning without requiring additional components.

The above configuration is useful for door systems that require operator mechanisms, as bracket assembly 400 integrates head stop 410 function with support for door operation equipment. The unified construction eliminates the need for separate components and fasteners, reducing installation time and minimizing potential failure points. The strategic positioning of head stop 410 relative to the vertical guides ensures proper alignment and coordinated operation, improving system reliability and reducing maintenance requirements. The integrated design also reduces the overall footprint of the assembly, allowing installation in space-constrained environments.

Figure 10B:
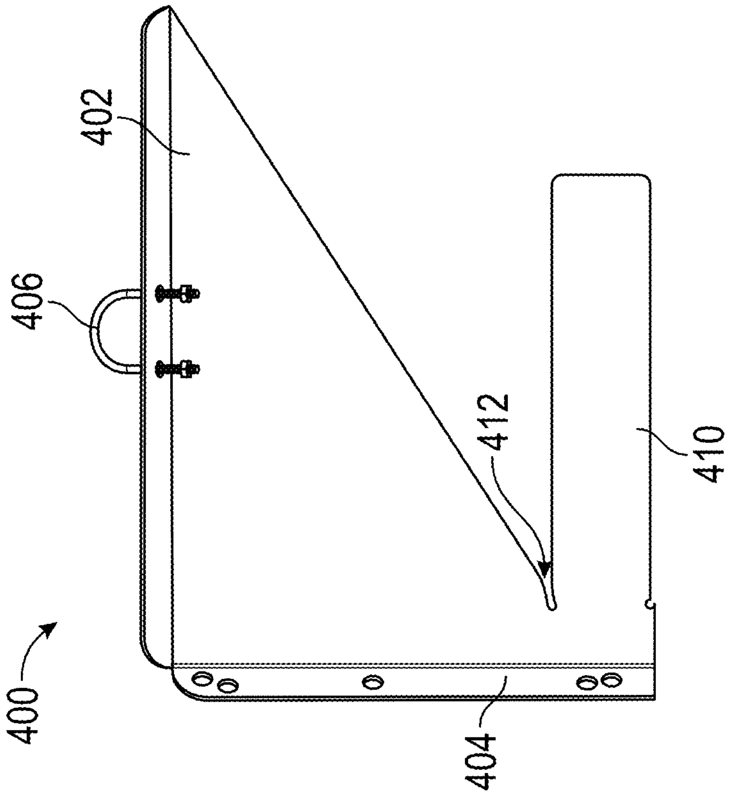

FIG. 10B shows another configuration of door operator bracket assembly 400 without extending section 408, in accordance with one embodiment of the present invention. FIG. 10A and FIG. 10B are shown to illustrate that door operator bracket assembly 400 can come in variety of shapes i.e., with or without extension 408, and other possible combinations can be made using the presently disclosed door operator bracket assembly 400. A person skilled in the art understands that all such modifications fall within the scope of the present invention.

Although the above description is explained illustrating one head stop integrated at the bottom of the bracket body, two or more head stops may also be integrated into the bracket body without departing from the scope of the present invention. Any modifications to the described bracket assembly fall within the scope of present invention.

In all of the above embodiments, the integrated design of the bracket assembly and head stop offers several benefits. These benefits include simplified installation, reduced part count, and improved reliability compared to traditional separate component designs. The bracket assemblies can be used with tensioning brackets, non-tensioning brackets, counterbalancing systems, and/or mounting assemblies for overhead doors and/or opening and closable pass-through entryways.

The integrated bracket assembly with head stop design offers significant advantages over prior art configurations. By combining multiple components into a single, unified structure, the present invention reduces installation time and complexity. This integration can eliminate the need for separate fasteners to connect the head stop and bracket body, potentially decreasing the risk of misalignment during installation and loosening of connections over time due to door vibration and movement. The unitary construction may also enhance overall system reliability by reducing the number of potential failure points. The bracket assembly secures moveable panels, curtains, sheets, flexible materials or materials that allow for passable entry or exit within vertical or horizontal guide/track support systems.

Furthermore, the innovative design incorporating perforated sections and strategically placed punched holes may provide installers with greater flexibility in customizing the assembly for specific door configurations. This adaptability can allow on-site adjustments without the need for additional parts or tools, potentially streamlining the installation process and reducing inventory management challenges. The integrated tensioning mechanisms and reinforced structures may also contribute to improved durability and performance of the door system over its operational lifetime, potentially reducing maintenance requirements and extending service intervals. The bracket assembly can accommodate additional brackets, mounts, and/or tensioners to be separately or additionally added, allowing for different operating/door systems.

A person skilled in the art appreciates that the bracket assembly can come in a variety of shapes and sizes depending on the need and comfort of the user. Further, many changes in the design and placement of components may take place without deviating from the scope of the presently disclosed bracket assembly.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A bracket assembly for a roll-up door system, said bracket assembly comprising:

a bracket body; and a head stop extending from said bracket body, wherein said head stop is configured to limit travel of a roll-up door, wherein said head stop comprises a plurality of perforated sections that create a hinge line in the material of said head stop to allow bending or rotation of said head stop relative to said bracket body.

2. The bracket assembly of claim 1, wherein said perforated sections comprise a series of small, spaced holes that allow said head stop to bend or fold into position.

3. The bracket assembly of claim 1, wherein said bracket body and said head stop form a gap at an intersection between said head stop and said bracket body.

4. The bracket assembly of claim 1, wherein said head stop comprises a plurality of first punched holes positioned away from said perforated sections, and wherein said first punched holes receive fasteners to secure said head stop to vertical guides.

5. The bracket assembly of claim 4, wherein said head stop comprises a plurality of second punched holes positioned adjacent to said perforated sections and opposite said first punched holes, and wherein said second punched holes are configured to receive fasteners to attach additional head stops.

6. The bracket assembly of claim 5, wherein said head stop comprises a plurality of third punched holes positioned adjacent to said perforated sections and perpendicular to said first punched holes and said second punched holes, and wherein said third punched holes are configured to receive fasteners to attach said additional head stops.

7. The bracket assembly of claim 1, wherein said bracket body comprises a bracket opening configured to receive an axle of said roll-up door system, and wherein said bracket body comprises a bracket stop configured to connect to the axle.

8. The bracket assembly of claim 1, wherein said bracket body comprises a tensioning drive for adjusting tension of said roll-up door system.

9. The bracket assembly of claim 1, wherein said bracket body comprises a plurality of guide tabs, and wherein said guide tabs are configured to connect said bracket body to vertical guides of said roll-up door system.

10. The bracket assembly of claim 1, wherein said head stop has a rectangular, square, or triangular shape.

11. The bracket assembly of claim 1, wherein said bracket body comprises an extending section, wherein said extending section extends below said bracket body, and wherein said head stop extends from said extending section.

12. A bracket assembly for a roll-up door system, said bracket assembly comprising:

a bracket body; and a head stop extending from said bracket body, wherein said head stop is configured to limit travel of a roll-up door;

a plurality of perforated sections positioned on said head stop; and a plurality of punched holes positioned adjacent to said perforated sections, wherein said perforated sections create a hinge line in the material of said head stop to allow bending or rotation of said head stop relative to said bracket body; and wherein said punched holes receive fasteners to attach said head stop to vertical guides and/or additional head stops.

13. The bracket assembly of claim 12, wherein said perforated sections comprise a series of small, spaced holes that allow said head stop to bend or fold into position.

14. The bracket assembly of claim 12, wherein said bracket body and said head stop form a gap at an intersection between said head stop and said bracket body.

15. The bracket assembly of claim 12, wherein said bracket body comprises a bracket opening configured to receive an axle of said roll-up door system, and wherein said bracket body comprises a bracket stop configured to connect to the axle.

16. The bracket assembly of claim 12, wherein said bracket body comprises a tensioning drive for adjusting tension of said roll-up door system.

17. The bracket assembly of claim 12, wherein said bracket body comprises a plurality of guide tabs, and wherein said guide tabs are configured to connect said bracket body to vertical guides of said roll-up door system.

18. The bracket assembly of claim 12, wherein said head stop has a rectangular, square, or triangular shape.

19. The bracket assembly of claim 12, wherein said bracket body comprises an extending section, wherein said extending section extends below said bracket body, and wherein said head stop extends from said extending section.

20. A method of providing a bracket assembly for a roll-up door system, said method comprising the steps of:

providing a bracket body;

providing a head stop extending from said bracket body, said head stop configured for limiting travel of a roll-up door; and providing a plurality of perforated sections positioned on said head stop, said perforated sections creating a hinge line in the material of said head stop to allow bending or rotation of said head stop relative to said bracket body.

* * * * *